United States Patent
Becker et al.

(10) Patent No.: US 7,236,991 B2
(45) Date of Patent: Jun. 26, 2007

(54) CHANGING THE DATA STRUCTURE WHICH AN APPLICATION PROGRAM IN A COMPUTER SYSTEM USES TO ACCESS DATABASE SYSTEMS

(75) Inventors: Wolfgang Becker, Ludwigshafen (DE); Siegfried Schmidt, Wiesloch (DE); Peter Pitterling, Ot Elsenz (DE); Michael De muth, Rauenberg (DE); Joanne Aponiewicz, Ridley Park, PA (US)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 10/480,544

(22) PCT Filed: Jun. 6, 2002

(86) PCT No.: PCT/EP02/06221

§ 371 (c)(1),
(2), (4) Date: Aug. 16, 2004

(87) PCT Pub. No.: WO02/101582

PCT Pub. Date: Dec. 19, 2002

(65) Prior Publication Data

US 2004/0267744 A1   Dec. 30, 2004

(30) Foreign Application Priority Data

Jun. 12, 2001   (EP) ................................. 01114215

(51) Int. Cl.
*G06F 12/00*   (2006.01)
*G06F 17/30*   (2006.01)
(52) U.S. Cl. ................... 707/200; 707/101; 707/102
(58) Field of Classification Search ................ 707/100, 707/102, 200, 203, 204

See application file for complete search history.

(56) References Cited

U.S. PATENT DOCUMENTS 5,625,815 A * 4/1997 Maier et al. ................... 707/8

(Continued)

FOREIGN PATENT DOCUMENTS

DE   19734413   1/1999

(Continued)

OTHER PUBLICATIONS

J. Wang et al., "A Technique for Upgrading Database Machines Online," Advances in Information Systems, First International Conference Proceedings, Advis 2000, Izmir, Turkey, (Oct. 25-27, 2000), pp. 82-91.

*Primary Examiner*—Sam Rimell
*Assistant Examiner*—Cory Bell
(74) *Attorney, Agent, or Firm*—Finnegan, Henderson, Farabow, Garrett & Dunner LLP

(57) ABSTRACT

Systems and methods are provided for changing a data structure, which an application program in a computer system uses to access database systems. According to an exemplary method, an application program communicates with a first database system to store entries in a source table having a first data structure. The method further includes creating a destination table in the first database system, such that the destination table has a second data structure and recording the type of change for those entries in the source table, which are changed when the application program communicates with the source table. The method further includes copying the destination table into a second database system and copying the source table in the second database system. Moreover, the method may include converting the entries in the copy of the source table from the first data structure to the second data structure and adjusting the changed entries in the source table to the copy of the source table, wherein the changed entries are copied from the source table as changed entries to the copy of the source table.

7 Claims, 11 Drawing Sheets

U.S. PATENT DOCUMENTS

| | | | |
|---|---|---|---|
| 5,893,119 A | 4/1999 | Squibb | 707/203 |
| 5,909,570 A * | 6/1999 | Webber | 703/13 |
| 6,122,630 A * | 9/2000 | Strickler et al. | 707/8 |
| 6,141,664 A | 10/2000 | Boothby | 707/201 |
| 6,205,451 B1 | 3/2001 | Norcott et al. | 707/204 |
| 6,385,770 B1 | 5/2002 | Sinader | 717/170 |

FOREIGN PATENT DOCUMENTS

| | | |
|---|---|---|
| DE | 19803697 | 3/2000 |
| WO | WO 99/08206 | 2/1999 |

* cited by examiner

CHANGING THE DATA STRUCTURE WHICH AN APPLICATION PROGRAM IN A COMPUTER SYSTEM USES TO ACCESS DATABASE SYSTEMS

This application is a national stage filing under 35 U.S.C. §371 of International Application No. PCT/EP02/06221, filed on Jun. 6, 2002, which published in the German language. This application also claims the benefit of priority under 35 U.S.C. §119(a) to EP 01114215.5, filed on Jun. 12, 2001.

FIELD OF THE INVENTION

The present invention relates generally to computer systems with an application program and a database, and in particular the invention relates to the changing of the data structures in these systems by means of upgrade.

BACKGROUND OF THE INVENTION

Relational databases are used for storing data from application programs. Data are structured in tables. As used below, a database system contains a database management system.

Technological progress and changing demands from customers require that the data structures in the database system be changed from time to time. An example which may be mentioned at this point by way of illustration is simply the extension of existing tables and the conversion of texts into other languages.

Acceptance of the application programs is dependent, inter alia, on their availability: for many programs, 24-hour availability is demanded 365 days a year. During changing, restrictions arise for the communication between the application program and the database system; in many cases, communication has to be interrupted completely.

Down times are undesirable but have technical conditionality, since a change to the data structure cannot be made simultaneously with the writing or alteration of the data contents. taneously with the writing or alteration of the data contents.

The sizes of the tables can be in the region of several gigabytes and can require down times of several hours.

It is the object to provide methods, system and computer programs for changing the data structure which allow the down times to be shortened.

SUMMARY OF THE INVENTION

In one embodiment, the present invention provides a method for transferring data from a first database system (original system) to a second database system (upgrade system) with an altered structure (upgrade).

Before the method is executed, an application program communicates with the first database system and, following execution of the method, can communicate with the second database system. Since, following execution, the contents of the data are identical in both database systems, it is always possible to fall back on the first database system in the event of problems (backup). The application's inactivity which is required for structure changes occurs after the method has been executed, in which case the inventive method itself no longer requires any down times.

In one embodiment, the invention relates to a method for changing the data structure which an application program in a computer system uses to access database systems. The method includes a step in which, an application program communicates with a first database system in order to store entries in a source table which has a first data structure. A destination table may be created in the first database system, the destination table having a second data structure which is different than the first data structure. The type of change may be recorded for those entries in the source table which are changed when the application program communicates with the source table. The destination table may be copied to a copy of the destination table in a second database system, the second data structure being retained in the copy of the destination table. The source table with its entries may be copied to a copy of the source table in the second database system, the first data structure being retained in the copy of the source table. The entries in the copy of the source table may be converted from the first data structure to the second data structure, the converted entries being stored in the copy of the destination table. The changed entries in the source table may be adjusted to the copy of the source table, the changed entries being copied from the source table as changed entries to the copy of the source table.

Options are the continuous execution of the communication step and the cyclic repetition of the conversion and adjusting steps, and the termination of the repetition under at least one of the following conditions: (a) the number of changed entries in the source table has undershot a prescribed number; (b) the time required for executing the conversion and adjusting steps undershoots a prescribed limit value. Another option is the inclusion of the copying steps in the repetition. One option is the additional step of keeping the copy of the destination table, executed after the conversion step. One option is for the recording step to involve generation of a recording in the first database system.

In another embodiment, the invention relates to a computer system for changing the data structure which an application program in a computer system uses to access database systems. The computer system may include a first data path as means for the application program to communicate with a first database system in order to store entries in a source table which has a first data structure. The computer system may further include a table creator as means for creating a destination table in the first database system, the destination table having a second data structure which is different than the first data structure. The computer system may further include a change identifier and second and third data paths as means for recording the type of change for those entries in the source table which are changed when the application communicates with the source table. The computer system may further include a fourth data path as means for copying the destination table to a copy of the destination table in the second database system, the second data structure being retained in the copy of the destination table. The computer system may further include a fifth data path as means for copying the source table with its entries to a copy of the source table in a second database system, the first data structure being retained in the copy of the source table. The computer system may further include a converter and sixth and seventh data paths as means for converting the entries in the copy of the source table from the first data structure to the second data structure, the converted entries being stored in the copy of the destination table. The computer system may further include an adjuster and eighth and ninth data paths as means for adjusting the changed entries in the source table to the copy of the source table, the changed entries being copied from the source table as changed entries to the copy of the source table.

In yet another embodiment, the invention relates to a computer program product for changing the data structure which an application program in a computer system uses to access database systems. The computer program product contains processor instructions including processor instructions for the application program to communicate with a first database system in order to store entries in a source table which has a first data structure. The computer program product may further include processor instructions for creating a destination table in the first database system, the destination table having a second data structure which is different than the first data structure. The computer program product may further include processor instructions for recording the type of change for those entries in the source table which are changed when the application program communicates with the source table. The computer program product may further include processor instructions for copying the destination table to a copy of the destination table in the second database system, the second data structure being retained in the copy of the destination table. The computer program product may further include processor instructions for copying the source table with its entries to a copy of the source table in a second database system, the first data structure being retained in the copy of the source table. The computer program product may further include processor instructions for converting the entries in the copy of the source table from the first data structure to the second data structure, the converted entries being stored in the copy of the destination table. The computer program product further includes processor instructions for adjusting the changed entries in the source table to the copy of the source table, the changed entries being copied from the source table as changed entries to the copy of the source table.

In still another embodiment, the invention relates to a method for changing the data structure which an application program in a computer system uses to access database systems. According to the methods, while the application program is communicating with a first database system in order to store entries in a source table which has a first data structure, the type of change may be recorded for those entries which are changed. The source table with its entries may be copied to a copy of the source table in the second database system, the first data structure being retained in the copy of the source table. A target table may be generated in the second database system, the target table having a second data structure which is different than the first data structure. The entries in the copy of the source table may be converted from the first data structure to the second data structure, the converted entries being stored in the target table. The changed entries in the source table may be adjusted to the copy of the source table, the changed entries being copied from the source table as changed entries to the copy of the source table. The conversion and adjusting steps may be repeated.

Subclaims relate to preferred embodiments of the invention. Optionally, computer system and computer program product are operated as described above: continuous execution of the communication process, cyclic repetition of the conversion and adjusting processes, termination of the repetition under at least one of the following conditions: (a) and (b), inclusion of the copying process in the repetition, keeping of the copy of the destination table, and recording in the first database system.

DETAILED DESCRIPTION OF THE INVENTION

Figure 1:
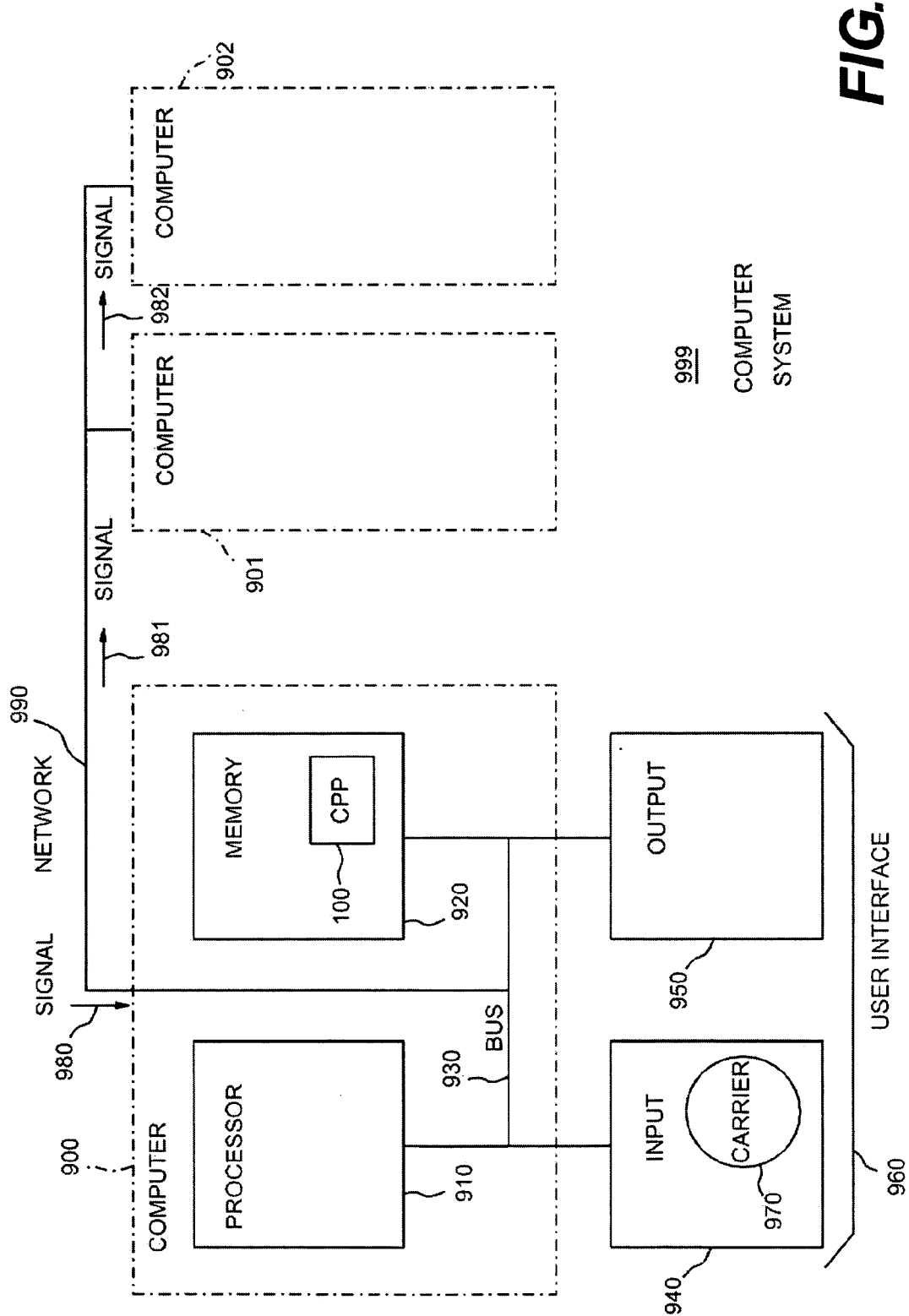
FIG. 1 shows a simplified block diagram of an inventive computer network system.

In the description below, examples of content are identified by apostrophes ''. The word "preferably" as an indication of advantageous but not necessary embodiments is abbreviated to "prfby". A summary of reference numerals and elements in the drawings can be found in front of the claims.

FIG. 1 shows a simplified block diagram of a computer network system 999 having a multiplicity of computers (or 90$q$, q=0 . . . Q−1, Q arbitrary).

The computers 900–902 are connected via a network 990. The computer 900 comprises a processor 910, a memory 920, a bus 930 and, optionally, an input device 940 and an output device 950 (input device and output device produce the user interface 960). The invention is in the form of a computer program product (CPP) 100 (or 10$q$, where q=0 . . . Q−1, Q arbitrary), in the form of a program carrier 970 and in the form of a program signal 980. These components are referred to below as program. The elements 100 and 910–980 of the computer 900 collectively illustrate the corresponding elements 10$q$ and 91$q$–91$q$ (shown for q=0 in the computer 90$q$).

The computer 900 is, by way of example, a conventional personal computer (PC), a multiprocessor computer, a mainframe computer, a portable or fixed PC or the like.

The processor 910 is, by way of example, a central processor (CPU), a microcontroller (MCU), or a digital signal processor (DSP).

The memory 920 symbolizes elements which store data and instructions either temporarily or permanently. Although the memory 920 is shown as part of the computer 900 to assist understanding, the memory function can also be implemented at another point in the network 990, for example in the computers 901/902 or in the processor 910 itself (e.g. cache, register). The memory 920 can be a read only memory (ROM), a random access memory (RAM) or a memory having other access options. The memory 920 is physically implemented on a computer-readable program carrier, for example on:

(a) a magnetic carrier (hard disk, diskette, magnetic tape);
(b) an optical carrier (CD-ROM, DVD);
(c) a semiconductor carrier (DRAM, SRAM, EPROM, EEPROM); or on any other carrier (e.g. paper).

Optionally, the memory 920 is distributed over various carriers. Parts of the memory 920 can be fitted on a permanent or replaceable basis. For the purposes of reading and writing, the computer 900 uses known means such as disk drives or tape drives.

The memory 920 stores support components, such as a Bios (Basic Input Output System), an operating system (OS), a program library, a compiler, an interpreter or a word processing program. Support components are commercially available and can be installed on the computer 900 by persons skilled in the art. To assist understanding, these components are not shown.

CPP 100 comprises program instructions and, optionally, data which prompt the processor 910, inter alia, to execute the method steps 430–450 in the present invention. The method steps are explained later in detail. In other words, the computer program 100 defines the operation of the computer 900 and its interaction with the network system 999. Without intending any restriction in this context, CPP 100 can, by way of example, be in the form of source code in any desired programming language and in the form of binary code in compiled form. A person skilled in the art is capable of using CPP 100 in connection with any of the support components explained above (e.g. compiler, interpreter, operating system).

Although CPP 100 is shown as being stored in the memory 920, CPP 100 can alternatively be stored at any other point. CPP 100 can likewise be stored on the program carrier 970.

The program carrier 970 is shown outside the computer 900. To transfer CPP 100 to the computer 900, the carrier 970 can be introduced into the input unit 940. The carrier 970 is implemented in the form of any desired, computer-readable carrier, such as in the form of one of the carriers explained above (cf. memory 920). Generally, the carrier 970 is a product which contains a computer-readable carrier storing computer-readable program code means which are used to execute the the method of the present invention. In addition, the program signal 980 can likewise comprise CPP 100. The signal 980 is transferred to the computer 900 via the network 990.

The detailed description of CPP 100, carrier 970 and signal 980 can be applied to the program carriers 971/972 (not shown), to the program signal 981/982, and to the computer program product (CPP) 101/102 (not shown), which is executed by the processor 911/912 (not shown) in the computer 901/902.

The input device 940 represents a device which provides data and instructions for processing by the computer 900. By way of example, the input device 940 is a keyboard, a pointer device (mouse, trackball, cursor arrows), a microphone, a joystick, a scanner. Although the examples are all devices with human interaction, the device 940 can also operate without human interaction, such as a wireless receiver (e.g. using a satellite antenna or terrestrial antenna), a sensor (e.g. a thermometer), a counter (e.g. a quantity counter in a factory). The input device 940 can likewise be used for reading the carrier 970.

The output device 950 represents a device which displays instructions and data which have already been processed. Examples thereof are a monitor or other display (cathode ray tube, flat screen, liquid crystal display, loudspeaker, printer, vibrating alarm). In a similar manner to the case of the input device 940, the output device 950 communicates with the user, but it can likewise communicate with other computers.

The input device 940 and the output device 950 can be combined in a single device. Both devices 940, 950 can be provided optionally.

The bus 930 and the network 990 represent logical and physical connections which transfer both instructions and data signals. Connections within the computer 900 are usually referred to as bus 930, and connections between the computers 900–902 are referred to as network 990. The devices 940 and 950 are connected to the computer 900 by the bus 930 (as shown) or optionally via the network 990. The signals in the computer 900 are predominantly electrical signals, whereas the signals in the network can be electrical, magnetic and optical signals or else wireless radio signals.

Network environments (such as network 990) are normal in offices, company-wide computer networks, intranets and on the Internet (i.e. World Wide Web). The physical distance between the computers in the network is of no significance. Network 990 can be a wireless network or a wired network. Possible examples of implementations of the network 990 which may be mentioned here are as follows: a local area network (LAN), a wide area network (WAN), an ISDN network, an infrared link (IR), a radio link, such as the Universal Mobile Telecommunication System (UMTS), or a satellite link.

Transfer protocols and data formats are known. Examples thereof are: TCP/IP (Transmission Control Protocol/Internet Protocol), HTTP (Hypertext Transfer Protocol), URL (Unique Resource Locator), HTML (Hypertext Markup Language), XML (Extensible Markup Language), WML (Wireless Application Markup Language), etc.

Interfaces for coupling the individual components are likewise known. To simplify matters, the interfaces are not shown. An interface can be, by way of example, a serial interface, a parallel interface, a game port, a universal serial bus (USB), an internal or external modem, a graphics adapter or a sound card.

Computer and program are closely related. In the description, expressions such as "the computer provides" and "the program provides" are normal abbreviations which describe program-controlled method steps in the computer.

Figure 2:
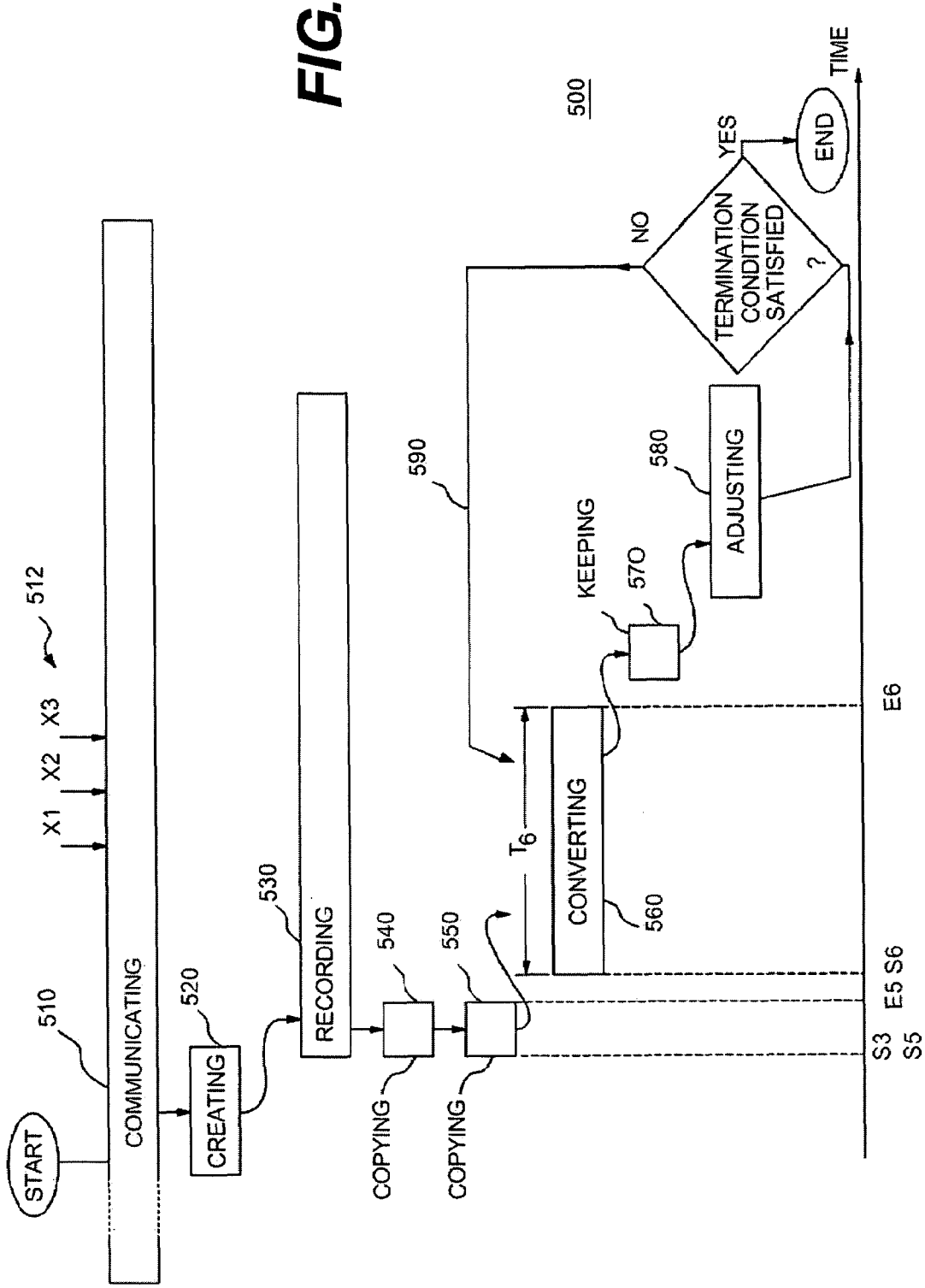
FIG. 2 shows a simplified flowchart of an inventive method in a first exemplary embodiment.

FIG. 2 shows the simplified flowchart of the inventive method 500 in a first exemplary embodiment. The method 500 contains the following method steps: communicating 510, creating 520, recording 530, copying 540 and 550, converting 560, keeping 570 (optionally), adjusting 580 and repeating 590 (optionally).

For the purpose of illustration, a time axis is shown horizontally: starting times Sn, ending times En and time intervals Tn follow the numbering of the reference numerals 5n0. By way of example, converting 560 starts at S6, lasts for T6 and ends at E6. In the description below, it has been agreed that the symbol ">" means "later than", the symbol "<" means "earlier than", and the symbol "=" means "essentially simultaneously". Method steps shown vertically above one another are prfby executed simultaneously.

The reference, number 512 denotes communication 510, where a source table 310 (cf. FIG. 6) is modified (at the times X1>S3, X2>S3, X3>S3). The steps 520, 540 and 550 require execution times T2, T4, T5 which are normally far below the execution times T1, T3 and T6 for the other steps 510, 530 and 560. An advantage is the execution of the steps 530–590 while the communication process 510 can be continued essentially unchanged. The method 500 is described after the description of the function groups which now follows.

Figure 3:
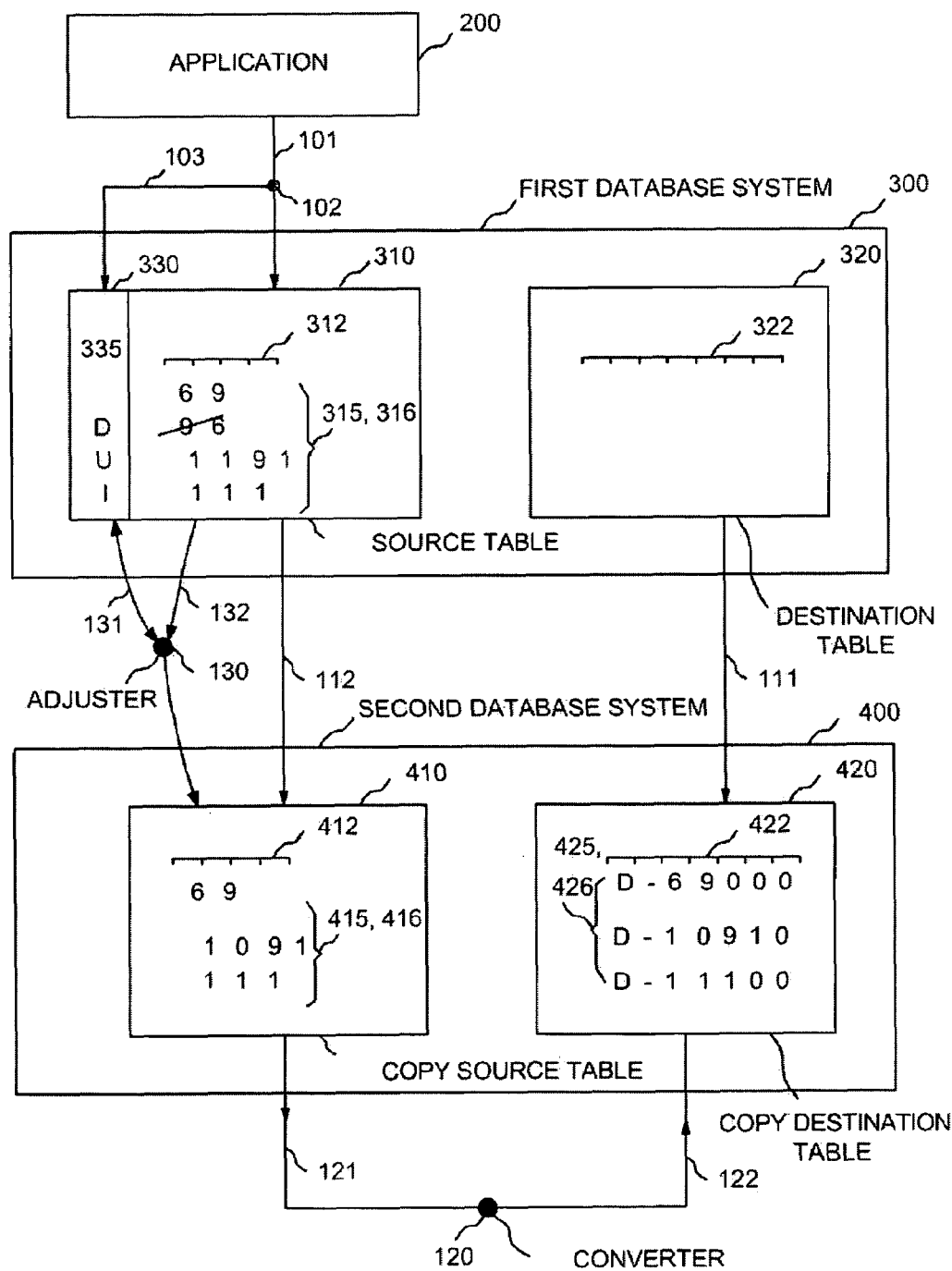
FIG. 3 shows a simplified block diagram of the function groups which execute the method shown in FIG. 2.

FIG. 3 shows a simplified block diagram of the function groups which execute the method shown in FIG. 2: application program 200 (below: application 200), first database system 300, second database system 400, and computer program product (CPP) 100 (cf. FIG. 1) with components 101–133.

In one preferred exemplary embodiment, the function groups are implemented as follows: application 200 from computer 900 (with processor 910), database system 300 from computer 901, and database system 400 from computer 902.

To simplify matters, the network 990 is not shown. The database systems 300 and 400, with which a person skilled in the art is familiar, contain operating systems and memory units.

According to the invention, the execution of the method 500 involves forming some function groups afresh; it is not necessary for them to exist before execution.

Figure 4:
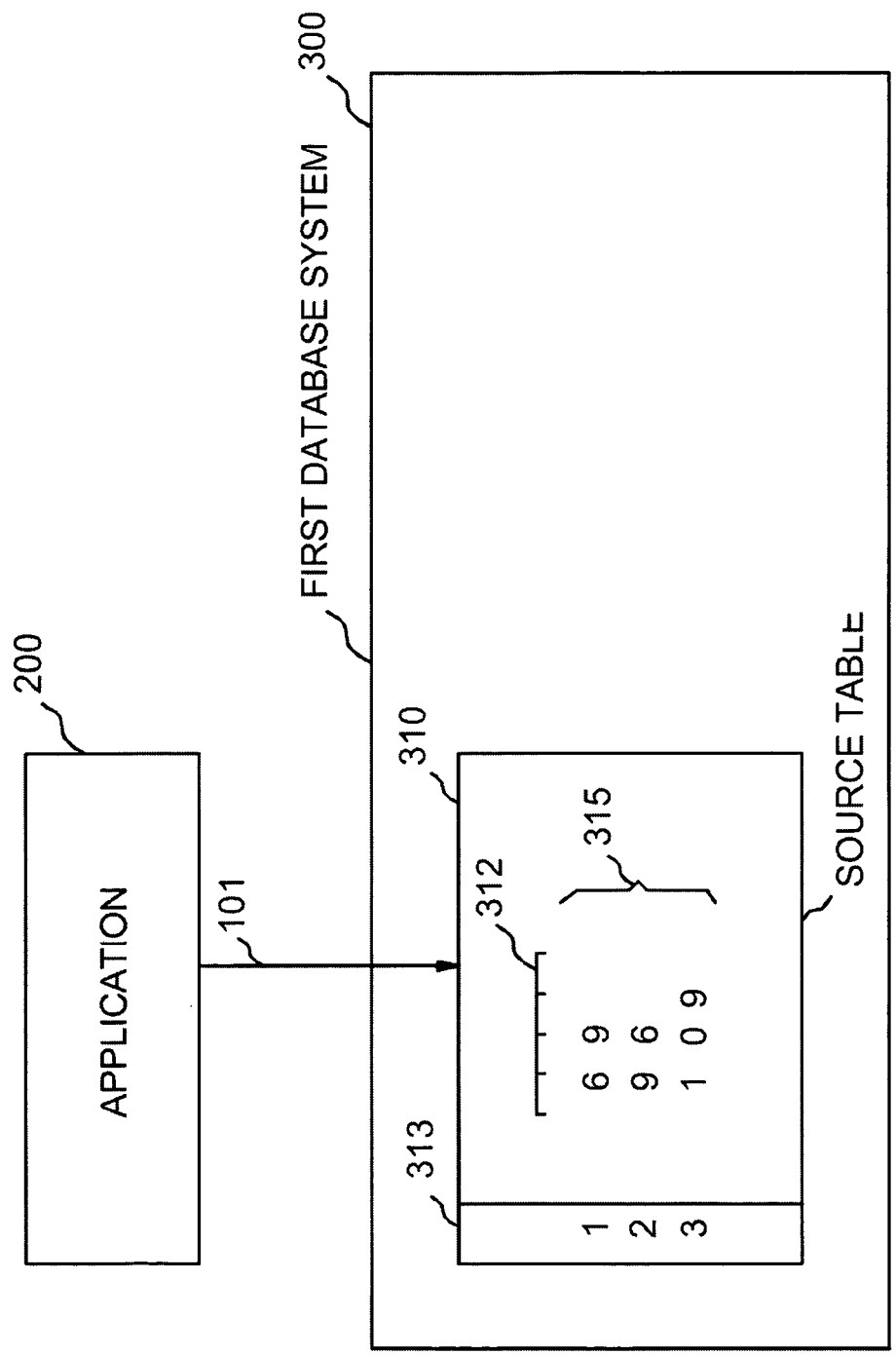
FIGS. 4–10 show simplified block diagrams of the function groups for each method step.
Figure 5:
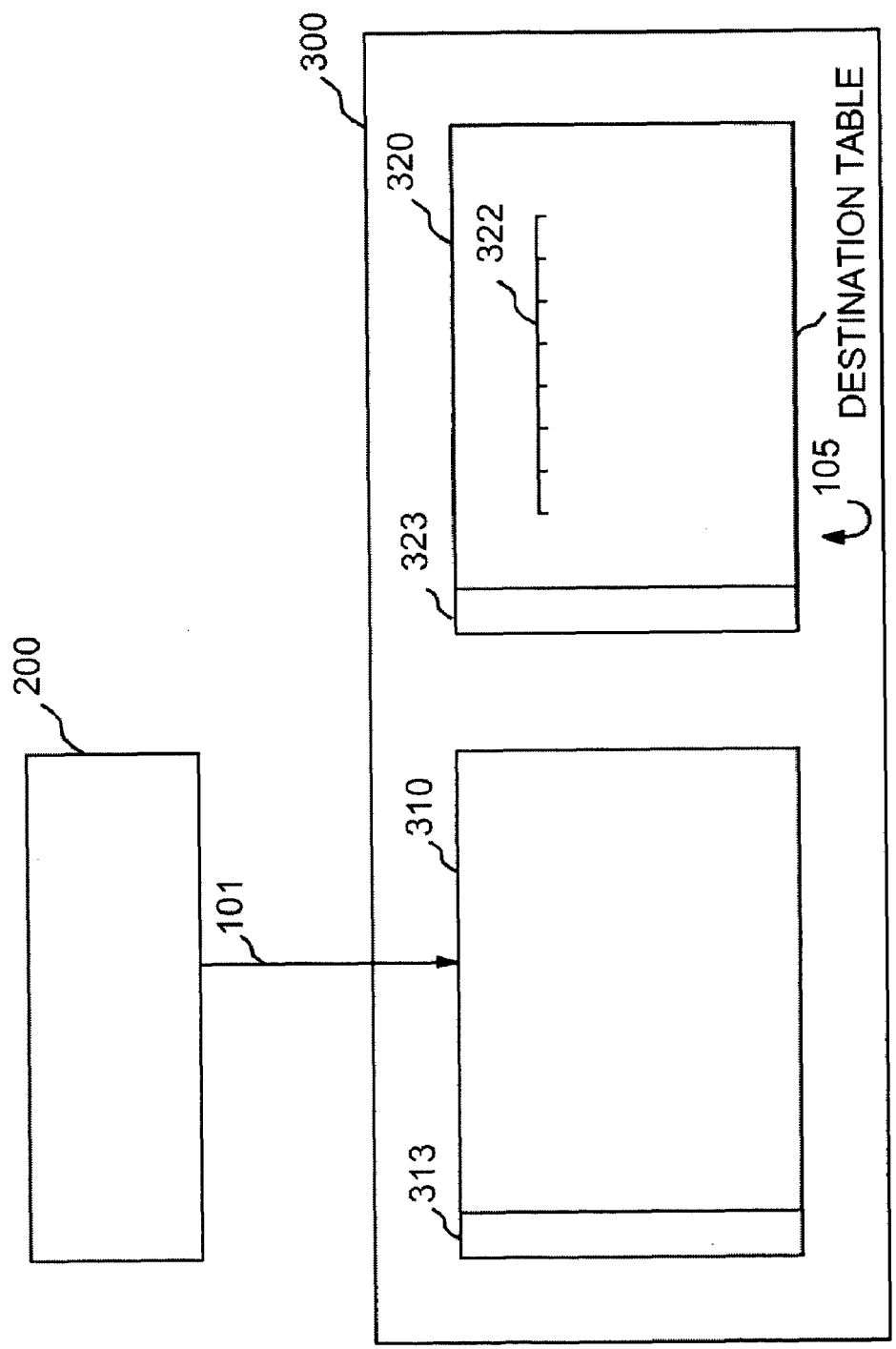
Figure 6:
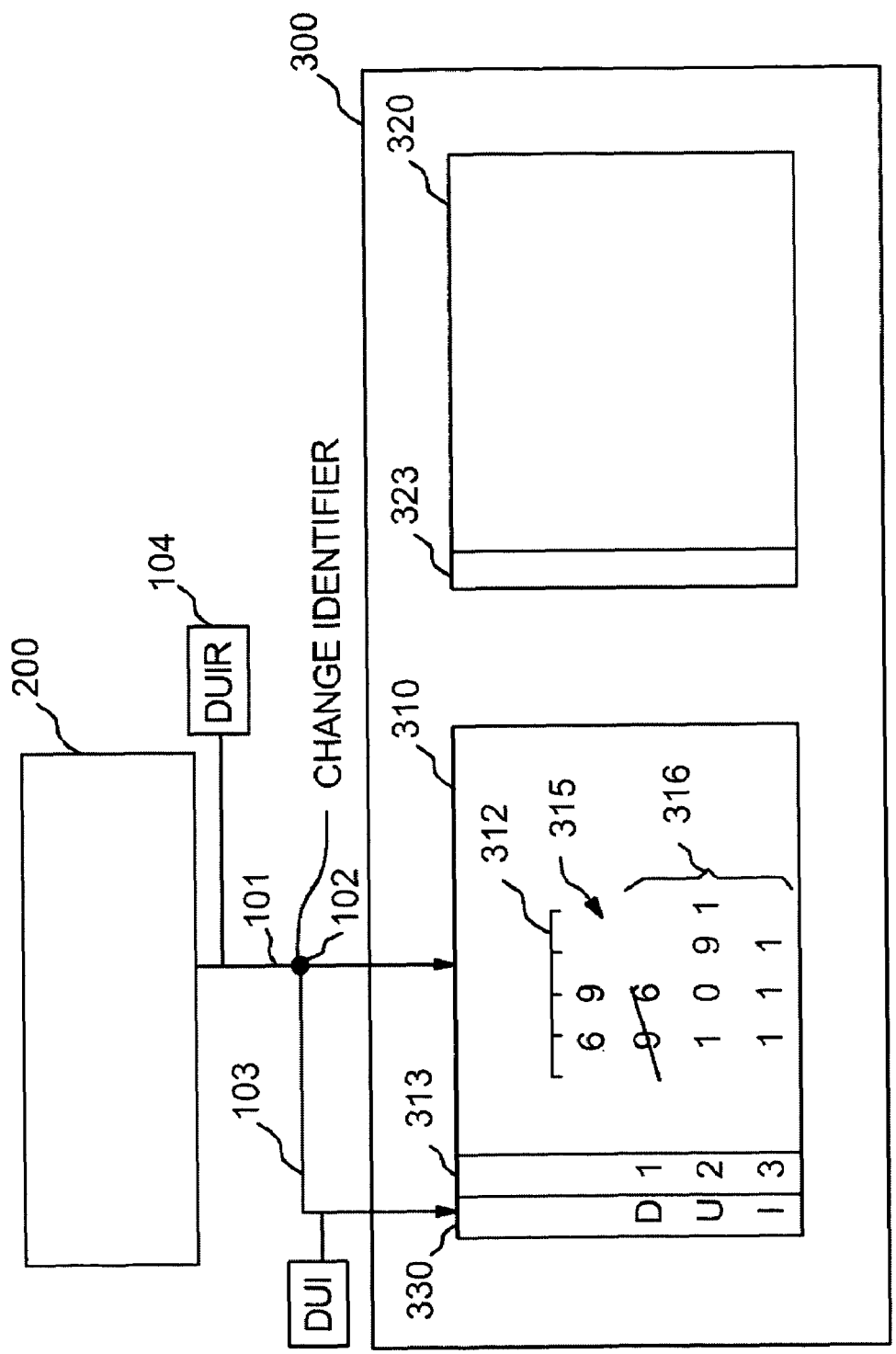

In the first database system 300, the source table 310 contains the entries 315 (i.e. data records) and the changed entries 316, which are all stored in a first data structure 312 (FIGS. 4, 6). The first database system 300 also contains a destination table 320 (target table, also: shadow table) having a second data structure 322 (FIG. 5). The first database system 300 also contains a recording 330 for storing the types of change 335 (types of change, FIG. 6), which describe the changes in the source table 310.

Figure 7:
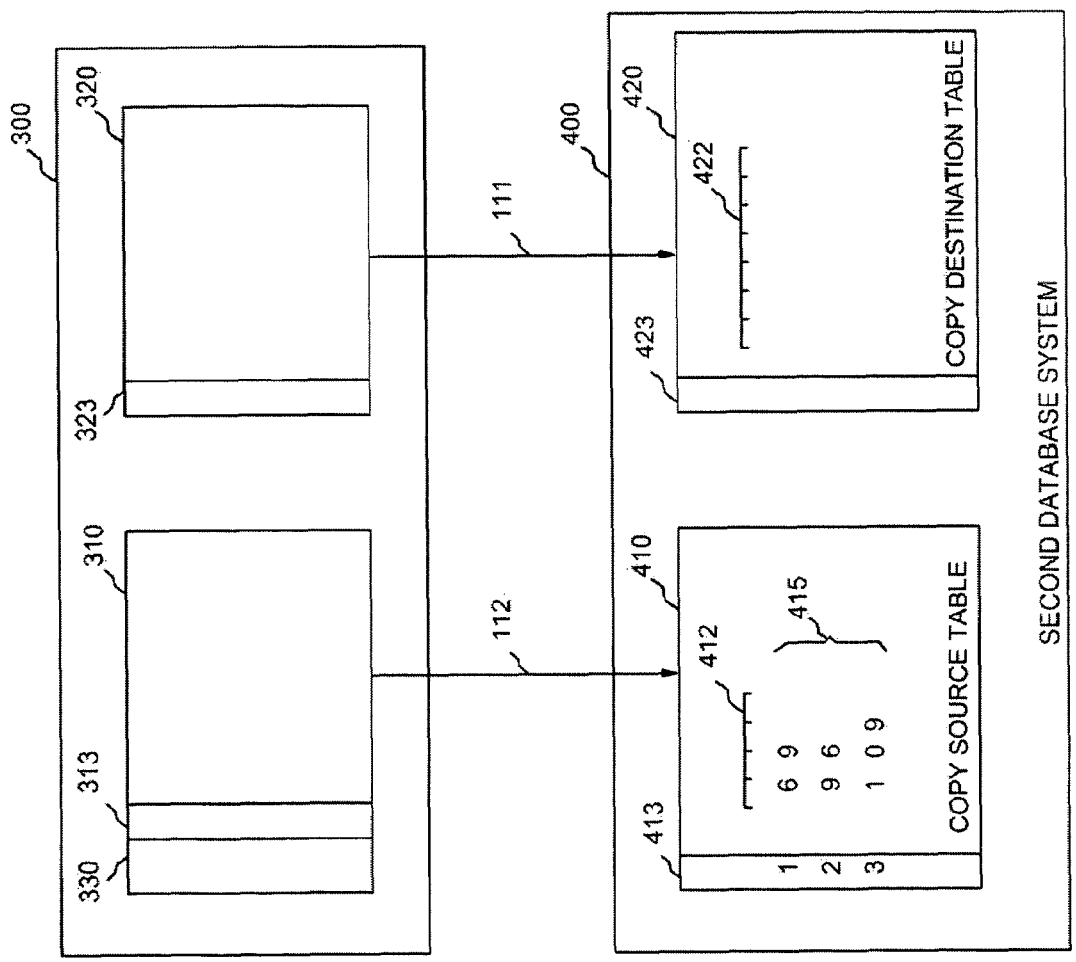
Figure 8:
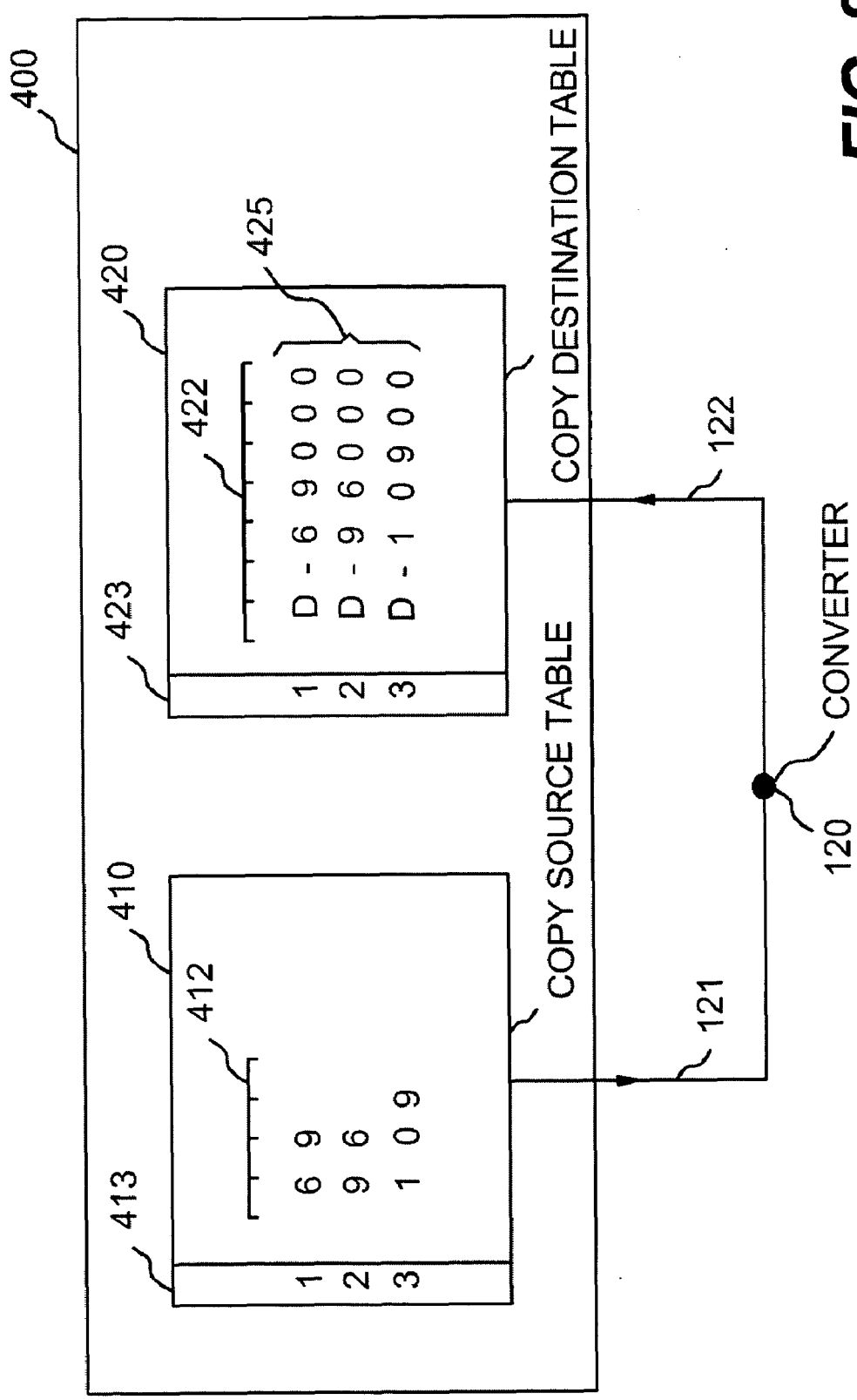

The second database system 400 contains a copy of the source table 410 (copy source table 410) and a copy of the destination table 420 (copy destination table 420), having the first 412 and second 422 data structures, respectively (FIG. 7). The copy source table 410 has entries 415 and changed entries 416; the copy destination table 420 has entries 425 and changed entries 426 (FIG. 8).

Upon execution of the method 500, table entries are transferred from the source table 310, having been restructured without any change of content, to the copy of the destination table 420 and are then available to the application 200 (or else to an altered application).

Both database systems 300 and 400 can be of the same type and in the same version. The two data structures are defined by external commands and the database systems.

The description allows a person skilled in the art to adapt the method 500 to a plurality of tables as well, for example by means of parallel processing.

Inventively provided means for executing the method (collectively referred to as CPP 100) are coded as program instructions for a processor. It is of no importance to the implementation of the present invention whether these means are produced by the same or by different processors. Prfby, the means are produced by the same processor 910 in the computer 900 as also executes the application 200.

The means provided in the exemplary embodiment are as follows: table creator 105, data path 101 application for source table, FIGS. 4–5), change identifier 102 (FIG. 6), data path 103 (change identifier for recording), data path 111 (destination table for copy source table, FIG. 7), data path 112 (source table for copy source table, FIG. 7), converter 120 (FIG. 8), data path 121 (copy source table for converter, FIG. 8), data path 122 (converter for copy destination table, FIG. 8), adjuster 130 (FIG. 9), data path 131 (recording for adjuster, FIG. 9), data path 131 (source table for adjuster, FIG. 9), and data path 132 (adjuster for copy source table, FIG. 9).

The data paths are used for transferring data. A person skilled in the art is able to provide signals in the network which transport the data on the basis of the paths. The data paths are normally activated by processor instructions; these instructions normally contain control instructions for database systems 300 and 400 like SQL instructions (structured query language). Other implementation options are, by way of example: split mirror technique and export/import instructions. The split mirror technique is explained in a series of publications, inter alia in "Siegfried Schmidt: 'SAP R/3 Storage Management, Split Mirror Backup Recovery on IBM's Enterprise Storage Server (ESS), SAP Aktiengesellschaft 1999". A person skilled in the art is able to apply the techniques described.

The method 500 for changing the data structure which the application 200 in the computer system 999 uses to access database systems is characterized by execution of the following steps:

the application 200 communicates 510 (using data path 101) with the first database system 300 in order to store entries 315 in the source table 310, which has the first data structure 312;

the destination table 320 is created 520 (using table creator 105) in the first database system 300, the destination table 320 having the second data structure 322, which is different than the first data structure 312;

the type of change 335 is recorded 530 (using change identifier 102 and data path 103) for those entries 316 in the source table 310 which are changed when the application 200 communicates 510 with the source table 310 (cf. 512);

the destination table 320 is copied 540 (using data path 111) to the copy destination table 420 in the second database system 400, the second data structure 322, 422 being retained in the copy destination table 420;

the source table 310 with its entries 315, 316 is copied 550 (using data path 112) to a copy source table 410 in the second database system 400, the first data structure 312, 412 being retained in the copy source table 410;

the entries 415 in the copy source table 410 are converted 560 (using converter 120 and data paths 121, 122) from the first data structure 412 to the second data structure 422, the converted entries 425 being stored in the copy destination table 420; and the changed entries 316 in the source table 310 are adjusted 580 (using adjuster 130 and data paths 131, 132) to the copy source table 410, the changed entries 316 being copied from the source table 310 as changed entries 416 to the copy source table 410.

FIGS. 4–10 show simplified block diagrams of the function groups. The illustration follows the inventive method: to illustrate the particularities, only the function groups which are involved in the method step described are therefore shown in each case.

FIGS. 4–10 use data structures based on the example of postcodes. The first data structure 312, 412 defines a maximum of 4 digits, at least 2 of which digits are in use (e.g. '69'); the second data structure 322, 422 defines 7 alphanumeric characters, which are all in use (e.g. 'D-69000'). To identify every single table entry 315, 316, 415, 416, 425, 426, each entry is assigned a key, for example, across the tables. A person skilled in the art is able to do this without requiring further explanation. FIGS. 4–10 show the tables 310, 320, 410 and 420 with key columns 313, 323, 413 and 423. The keys themselves are denoted by digits 1, 2, 3 and 4.

Reference numerals and keys identify every single entry. In the description, the key is appended to the reference numeral if appropriate: thus, in the description for FIG. 6, for example, for entry 316-2 with content '1091'.

The small number of keys serves to simplify the illustration. The inventive method can advantageously be used for tables with more entries.

FIG. 4 shows the communication process 510, where the application 200 stores the entries 315 ('69', '96', and '109') in the source table 310 (with data structure 312). The application 200 determines which entries 315 are stored; the converse case of reading entries from the source table 310 into the application 200 is not fundamental to the invention and is therefore not considered in the present case. The data path 101 from the application 200 to the source table 310 is normally already present in data processing systems and can be adopted in unaltered form. As mentioned in the introduction, the communication process 510 normally occurs over a long period of time in which the application 300 or the database system 300 are not modified. Only the data are modified.

FIG. 5 shows the creation process 520 for the destination table 320. Table creator 105 is the means to this end. The destination table 320 prfby does not store any entries. The second data structure 322 (for 7 alphanumeric characters, for example) is already being stipulated, however. The creation process 520 is executed in parallel with the communication process 510. The application 200 continues to communicate with the database system 300. During the creation process 520, the data path 101 remains unaltered. The table creator 105 is implemented, by way of example, using the SQL instruction "create table destination_table_320 (postcode varchar (7))".

FIG. 6 shows the recording process 530 effected in parallel with the communication process 510. The application 200 is known to prompt read and write access operations to the source table 310 during the communication process 510 by virtue of the application 200 sending instructions 104 to the database system 300 via path 101. In FIG. 6, these instructions 104 are denoted by the letters D (delete), U (update), I (insert) and R (read). The change identifier 102 forwards types of change 335 for those instructions 104 which prompt write access operations (e.g. only D, U, I, not R) to the recording 330 via data path 103. The change identifier 102 can be produced using a database trigger known to a person skilled in the art.

Entries in the source table 310 which are changed (cf. 512) by the communication process 510 in line with S3 (start of the recording process 530) are denoted by 316. The types of change 335 are assigned to the key for the changed entries 316. Normally, every changed entry 316 has a type of change 335. In connection with the present description, the types of change 335 are abbreviated using letters. Types of change 335 are, by way of example, D (delete) for entries which are deleted from the source table 310 (e.g. '96' for key 2); U (update) for entries which are modified in the source table 310 (e.g. '109' to '1091' for key 3); I (insert) for entries which are newly added to the source table 310 (e.g. entry 316-4 '111' for key 4). In the example, the key column 313 is used both for the source table 310 and for the recording 330.

A person skilled in the art is able to implement alternatives: (a) recordings separate from the source table 310 for D, U and I, respectively, (b) a recording which is separate from the source table 310 for D, U and I, indicating the keys (log table) etc. As FIG. 6 shows, the recording process 530 generates the recording 330 prfby in the first database system 300.

For the type of change U, the change identifier 102 can be produced, by way of example, using the following SQL instructions "create trigger change_identifier_102, before update of entries_315 in source_table 310 on source_table_310 begin . . . (set type of change to U) . . . end".

FIG. 7 shows the copying process 540, where the destination table 320 is copied to the second database system 400 as copy destination table 420 via the data path 111. The copying process 540 prfby directly follows the start of the recording process 530, and the copying process 540 prfby takes place in parallel with the copying process 550. Since the destination table 320 contains no entries, only the structure is copied: the second data structure 322, 422 is retained. In the example, the copy destination table 420 is ready to hold entries with 7 alphanumeric characters.

FIG. 7 also shows the copying process 550, where the source table 310 is copied to the second database system 400 as copy source table 410 via the data path 112. Entries 315-1 '69', 315-2 '96' and 315-3 '109' (cf. FIG. 6) are transferred unaltered as entries 415-1, 415-2 and 415-3. Since the copying process 550 prfby directly follows the start of the recording process 530 (i.e. S5=S3), any changes in the source table 310 would actually be detected in recording 330 during the copying process. The first data structure 312, 412 is retained. Since, in the example, changes in the source table 310 do not occur until after the time E5 (that is to say after the copying process 550), entries 316 (cf. FIG. 6) are not yet transferred to the copy source table 410. In other words, the changed entries 316 are not yet available during (T5) the copying process 550. It is an advantage of the invention that these entries 316 are taken into account in later method steps.

A suitable technique for the copying processes 540 and 550 is the known split mirror technique, which, during the copying process, permits read and write access operations to the table which is to be copied. This technique advantageously allows the communication process 510 at the same time.

FIG. 8 shows the conversion process 560 for the entries 415 in the copy source table 410 from the first data structure 412 to the second data structure 422, the converted entries 425 being stored in the copy destination table 420. The conversion process 560 takes place via data path 121, converter 120 and data path 122. The conversion process 560 takes place within the second database system 400.

The data path 121 transfers the entries 415 to the converter 120; the converter 120 converts the entries 415 to the second data structure 422 on the basis of a predetermined rule (e.g. append letter with hyphen, fill with zeros), and the data path transfers the converted entries 425 to the copy destination table 420. The conversion process 560 normally requires a period of time T6 for which down times for the application 200 would not be economically feasible. It is an advantage of the present invention that the conversion process 560 can be executed without interrupting communication 510.

Figure 9:
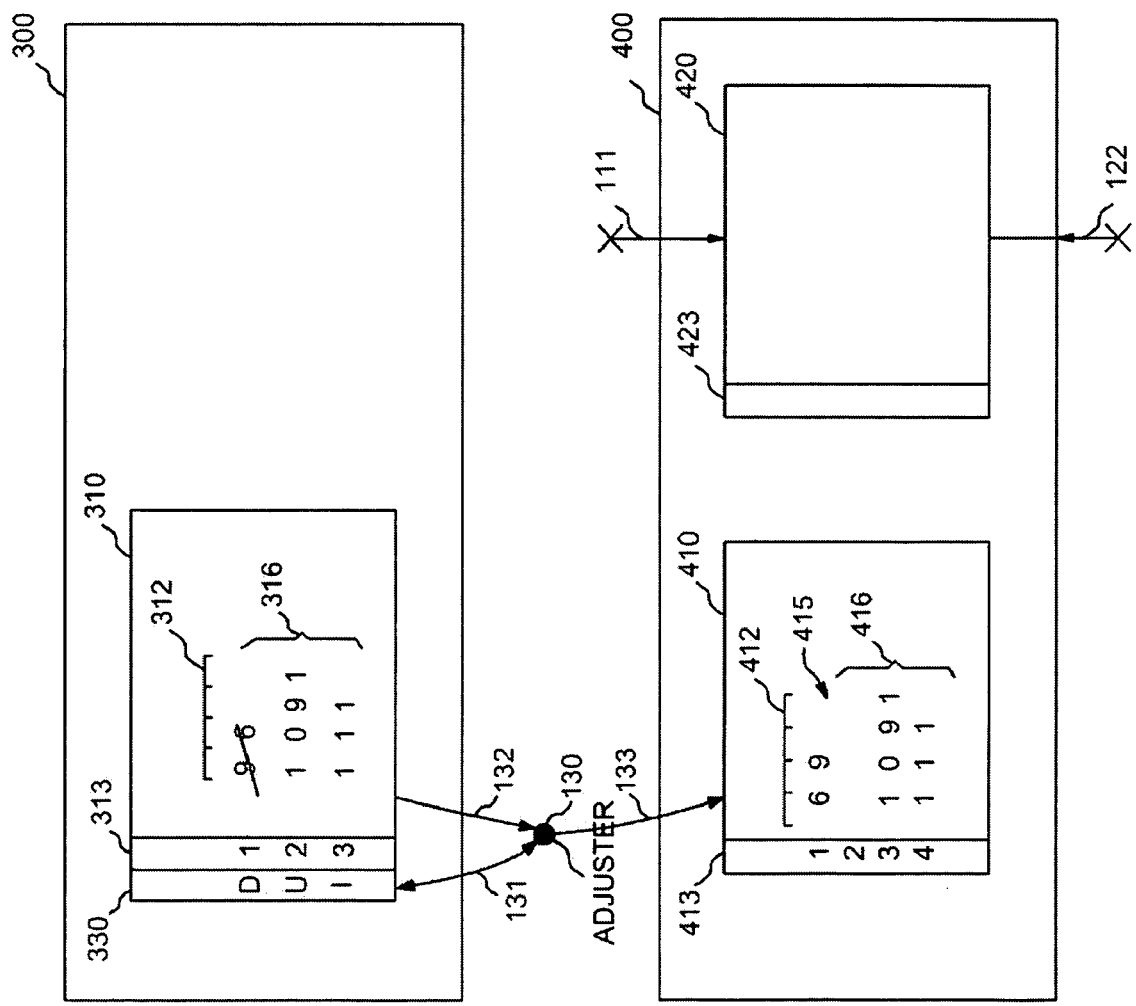

FIG. 9 shows the additional step of keeping 570 the copy destination table 420, executed after conversion process 560. In this context, writing to the copy destination table 420 via the data path 111 and reading from the copy destination table 420 via the data path 122 are prevented. In other words, the data paths 111 and 122 have been deactivated.

FIG. 9 shows the adjusting process 580 for the changed entries 316 in the source table 310 to match the copy source table 410. The changed entries 316 from the source table 310 (cf. FIG. 6 '96' deleted, '1091' and '111') are copied as changed entries 416 to the copy source table 410. In this case, the following operations are performed in the copy source table 410: deletions (D, '96' for key 2), modifications (U, '1091' for key 3) and additions (I, '111' for key 4).

In this case, the recording 330 transferred to the adjuster 130 via the data path 131 (2D, 3U, 4I) is prfby taken into account. The adjuster 130 evaluates the recording 330 and forwards the changed entries 316 via the data paths 132 and 133. As indicated by the double-headed arrow in path 131, the adjuster 130 optionally prompts a change to the recording 330 (FIG. 7) for entries which have already been transferred. Types of change 335 which have already been taken into account are prfby deleted or deactivated.

Optionally, to simplify the method, all the entries 315, 316 can be copied to 415, 416 during the adjusting process 580. This is not necessary, however.

Figure 10:
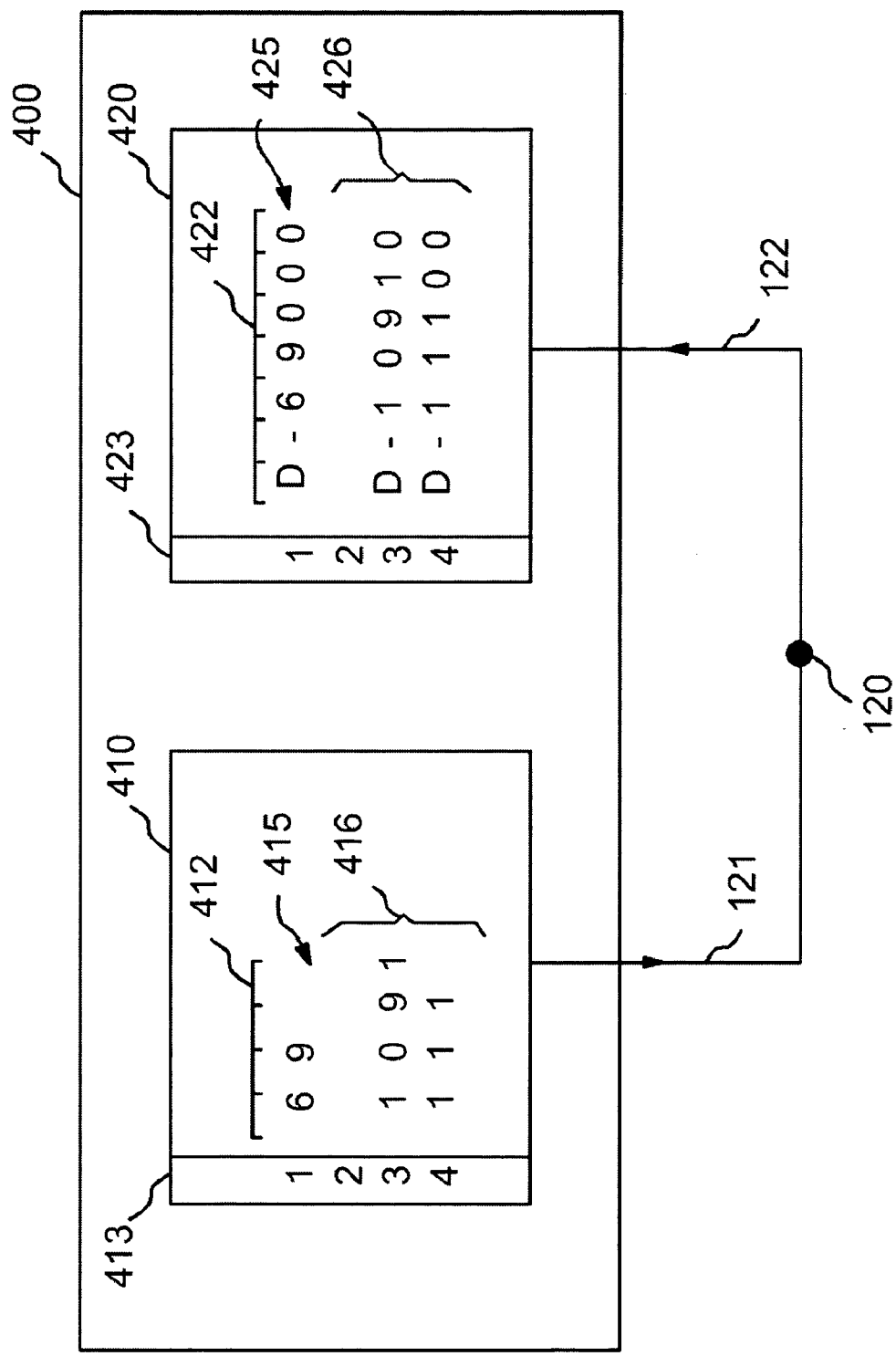

FIG. 10 shows how the changed entries 416 are transferred from the copy source table 410 as entries 426 to the copy destination table by virtue of the cyclic repetition 590 of the conversion 560 and adjusting 580 steps. In the example: the entry 425-1 ('D-69000' for key 1) remains unchanged, the entry 425-2 ('D-96000', cf. FIG. 8) has been deleted, the entry 426-3 ('D-10910') has been changed, and the entry 426-4 ('D-11100') has been added.

The repetition 590 is terminated as soon as one of the following conditions has been satisfied:

(a) The number of changed entries 316 in the source table 310 has undershot a prescribed number.

(b) The time required by the processor 910 for executing the conversion 560 and adjusting 580 steps undershoots a prescribed limit value.

(c) Changes become necessary in the database system 300 which are not connected to method 500 but which require that execution of the application 200 be interrupted anyway.

Optionally, the copying steps 540 and 550 can be included in the repetition 590, the copying process being advantageous for subregions of the tables. These subregions are advantageously determined by the recording 330.

It is advantageous that, when the method 500 is executed, the communication process 510 between application 200 and first database system 300 is continued essentially uninterrupted. In this case, it is possible for the application 200 to write further entries 316 to the source table 310. When the method has been executed, the communication is briefly interrupted in order to transfer these further changed entries 316 to the copy destination table 420. In this case, a person skilled in the art makes use, by way of example, of the elements adjuster 130, converter 120 and of the associated data paths.

Figure 11:
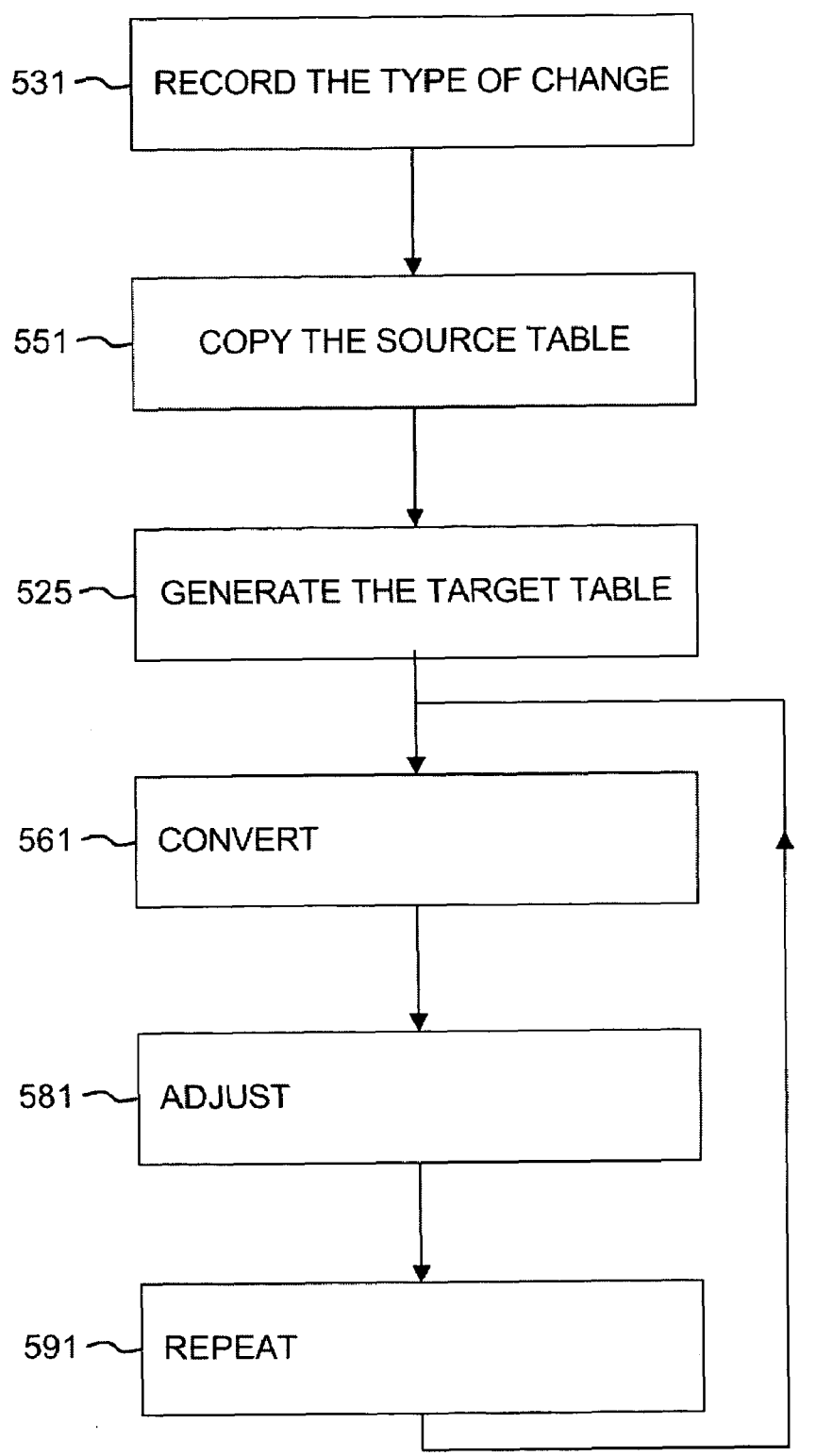
FIG. 11 shows the simplified flowchart of the inventive method in a second exemplary embodiment.

FIG. 11 shows the simplified flowchart of the inventive method 501 in a second exemplary embodiment. The description for FIGS. 1–10 also applies to the method 501. The method 501 is derived from the method 500; in both methods, the steps of communication 510/511, recording 530/531, copying 550/551, converting 560/561, adjusting 580/581 and repeating 590/591 are the same; the steps of creating 520 and copying 540 in the method 500 are combined to produce the step of generating 525 in the method 501. In the first database system 300, no further destination table is created, and no further destination table is copied either, but rather a target table 420 is created directly in the second database system 400. The target table 420 in the method 501 corresponds to the copy destination table 420 in the method 500. The method has the following method steps:

while the application program 200 is communicating 511 (using data path 101) with the first database system 300 in order to store entries 315 in the source table 310 (first data structure 312), the type of change 335 for those entries 316 which are changed is recorded 531 (using change identifiers 102 and 103);

the source table 310 with its entries 315, 316 is copied 551 (using data path 112) to the copy source table 410 in the second database system 400, the first data structure 312, 412 being retained in the copy of the source table 410;

the target table 420 is generated 525 (using table generator, not shown since similar to creator 105) in the second database system 400, the target table 420 having the second data structure 422, which is different than the first data structure 312;

the entries 415 in the copy source table 410 are converted 561 (using converter 120 and data paths 121, 122) from the first data structure 412 to the second data structure 422, the converted entries 425 being stored in the target table 420;

the changed entries 316 in the source table 310 are adjusted 581 (using adjuster 130 and data paths 131, 132) to the copy of the source table 410, the changed entries 316 being copied from the source table 310 as changed entries 416 to the copy source table 410; and the conversion 561 and adjusting 581 steps are repeated 591 (termination under the conditions described above).

As a summary of the two exemplary embodiments 500/501, the present invention is described as a computer system 900 for changing the data structure which the application program 200 in the computer system 999 uses to access database systems 300, 400. The computer system 900 is characterized by:

a first data path 101 as means for the application program 200 to communicate 510, 511 with the first database system 300 in order to store entries 315 in the source table 310 which has the first data structure 312;

a table creator 105 as means for creating 520 the destination table 320 (first exemplary embodiment) in the first database system 300 (destination table 320 having data structure 322 which is different than data structure 312) or as means for generating 525 the target table 420;

a change identifier 102 and second and third data paths 102, 103 as means for recording 530/531 the type of change 335 for those entries 316 in the source table 310 which are changed when the application 200 communicates 510/511 with the source table 310;

a fourth data path 111 as means for copying 540 the destination table 320 to the copy destination table 420 in the second database system 400, the second data structure 322, 422 being retained in the copy destination table 420 (only first exemplary embodiment 500);

a fifth data path 112 as means for copying 550/551 the source table 310 with its entries 315, 316 to the copy source table 410 in the second database system 400, the first data structure 312, 412 being retained in the copy source table 410;

a converter 120 and sixth and seventh data paths 121, 122 as means for converting 560/561 the entries 415 in the copy source table 410 from the first data structure 412 to the second data structure 422, the converted entries 425 being stored in the copy destination table 420 (first example) or in the target table 420 (second example); and an adjuster 130 and eighth and ninth data paths 131, 132 as means for adjusting 580/581 the changed entries 316 in the source table 310 to the copy source table 410, the changed entries 316 being copied from the source table 310 as changed entries 416 to the copy source table 410.

As a summary of the two exemplary embodiments 500/501, the present invention is described as a computer program product 100 for changing the data structure which the application program 200 in the computer system 999 uses to access database systems 300, 400. The computer program product 100 has processor instructions and is characterized by:

processor instructions for the application program 200 to communicate 510/511, 101 with the first database system 300 in order to store entries 315 in the source table 310 which has a first data structure 312;

processor instructions for creating 520, 105 the destination table 320 in the first database system 300, the destination table 320 having a second data structure 322 which is different than the first data structure 312 (first example 500) or alternatively processor instructions for generating 525 the target table 420 in the second database system 400, the target table 420 having a second data structure 422, which is different than the first data structure 312, 412 (second example 501);

processor instructions for recording 530/531, 102, 103 the type of change 335 for those entries 316 in the source table 310 which are changed 512 when the application program 200 communicates 510, 511, 101 with the source table 310;

processor instructions for copying 540, 111 the destination table 320 to the copy destination table 420 in the second database system 400, the second data structure 322, 422 being retained in the copy of the destination table 420 (first example);

processor instructions for copying 550/551, 112 the source table 310 with its entries 315, 316 to the copy source table 410 in the second database system 400, the first data structure 312, 412 being retained in the copy source table 410;

processor instructions for converting 560/561, 120, 121, 122 the entries 415 in the copy source table 410 from the first data structure 412 to the second data structure 422, the converted entries 425 being stored in the copy of the destination table 420 (or target table 420); and processor instructions for adjusting 580/581, 130, 131, 132 the changed entries 316 in the source table 310 to the copy source table 410, the changed entries 316 being copied from the source table 310 as changed entries 416 to the copy of the source table 410.

A person skilled in the art is able to modify the present invention without departing from the scope thereof.

LIST OF REFERENCE NUMERALS

Numeral Element
100 Computer program product (CPP)
101 Data path from application to source table
102 Change identifier
103 Data path from change identifier to recording
104 Instructions
105 Table creator
111 Data path from destination table to copy source table
112 Data path from source table to copy source table
120 Converter
121 Data path from copy source table to converter
122 Data path from converter to copy source table
130 Adjuster
131 Data path from recording to adjuster
131 Data path from source table to adjuster
132 Data path from adjuster to copy source table
200 Application
300 First database system
310 Source table
312, 412 First data structure
313, 323 Key column
315 Entries in source table
316 Changed entries in source table
320 Destination table
322, 422 second data structure
330 Recording
335 Types of change
400 Second database system
410 Copy source table
413, 423 key column
415 Entries in copy source table
416 Changed entries in copy source table
420 Copy destination table (target table)
425 Entries in copy destination table
426 Changed entries in copy destination table
500, 501 Methods
510, 511 Communication process
512 Communication
520 Creation process
525 Generation process
530, 531 Recording process
540 Copying process
550, 551 Copying process
560, 561 Conversion process
570 Keeping process
580, 581 Adjusting process
590, 591 Repetition process
910 Processor
920 Memory
930 Bus
940 Input device
950 Output device
960 User interface
970 Program carrier
980 Program signal
990 Network

The invention claimed is:

1. A method for changing a data structure which an application program in a computer system uses to access database systems, the method comprising the following method steps:

communicating, using the application program, with a first database system in order to store entries in a source table which has a first data structure;

creating a destination table in the first database system, the destination table having a second data structure which is different than the first data structure;

recording a type of change for those entries in the source table which are changed when the application program communicates with the source table;

copying the destination table to a copy of the destination table in a second database system, the second data structure being retained in the copy of the destination table;

copying the source table with its entries to a copy of the source table in the second database system, the first data structure being retained in the copy of the source table;

converting the entries in the copy of the source table from the first data structure to the second data structure, the entries converted from the first data structure to the second data structure being stored in the copy of the destination table; and adjusting the entries changed when the application program communicates with the source table to the copy of the source table, the entries changed when the application program communicates with the source table being copied from the source table as changed entries to the copy of the source table.

2. The method as claimed in claim 1, wherein the communicating step is continuously executed and the converting and adjusting steps are cyclically repeated.

3. The method as claimed in claim 2, wherein the converting and adjusting steps are terminated under at least one of the following conditions:
   (a) a number of changed entries in the source table has undershot a prescribed number; and
   (b) a time required for executing the converting and adjusting steps undershoots a prescribed limit value.

4. The method as claimed in claim 3, wherein the copying step is cyclically repeated.

5. The method as claimed in claim 1, wherein a step of keeping the copy of the destination table is executed after the converting step.

6. The method as claimed in claim 1, wherein the recording step involves generation of a record in the first database system.

7. A computer system for changing a data structure which an application program in a computer system uses to access database systems, the computer system comprising:
   means for communicating with a first database system in order to store entries in a source table which has a first data structure;
   means for creating a destination table in the first database system, the destination table having a second data structure which is different than the first data structure;
   means for recording a type of change for those entries in the source table which are changed when communicating with the source table;
   means for copying the destination table to a copy of the destination table in a second database system, the second data structure being retained in the copy of the destination table;
   means for copying the source table with its entries to a copy of the source table in the second database system, the first data structure being retained in the copy of the source table;
   means for converting the entries in the copy of the source table from the first data structure to the second data structure, the entries converted from the first data structure to the second data structure being stored in the copy of the destination table; and
   means for adjusting the entries changed when communicating with the source table to the copy of the source table, the entries changed when communicating with the source table being copied from the source table as changed entries to the copy of the source table.

* * * * *